United States Patent
Backus

[15] 3,703,757
[45] Nov. 28, 1972

[54] FASTENING DEVICE

[72] Inventor: James H. Backus, 3320 Franconia Road, Alexandria, Va. 22310

[22] Filed: Dec. 8, 1970

[21] Appl. No.: 96,129

[52] U.S. Cl. .............29/200 P, 29/212 D, 29/243.57
[51] Int. Cl. ......B23p 19/00, B23q 7/10, B23p 11/00
[58] Field of Search..29/200 P, 212 D, 200 B, 212 R, 29/200 R, 211 D, 243.57

[56] References Cited

UNITED STATES PATENTS 3,381,359    5/1968    Schroeder.................29/212 D

Primary Examiner—Thomas H. Eager
Attorney—Irons, Sears, Staas, Halsey and Gable

[57] ABSTRACT

A fastener driving machine featuring conventional means for propelling the fasteners, for example, staples, in combination with a novel guiding system comprising a pair of arms provided with longitudinal grooves along which the fasteners travel and adjustable anvil means mounted for predetermined movement in relation to the arms and including curvilinear surfaces against which the fasteners strike causing the ends thereof to bend backward in securing relation, the fastener driving machine designed particularly for use in the construction of ferro-cement marine hulls wherein groupings or wires forming the framework thereof must be fastened together at preselected points.

3 Claims, 8 Drawing Figures

PATENTED NOV 28 1972 3,703,757

INVENTOR
JAMES H. BACKUS

BY Brufsky, Staas,
Breiner & Halsey
ATTORNEYS

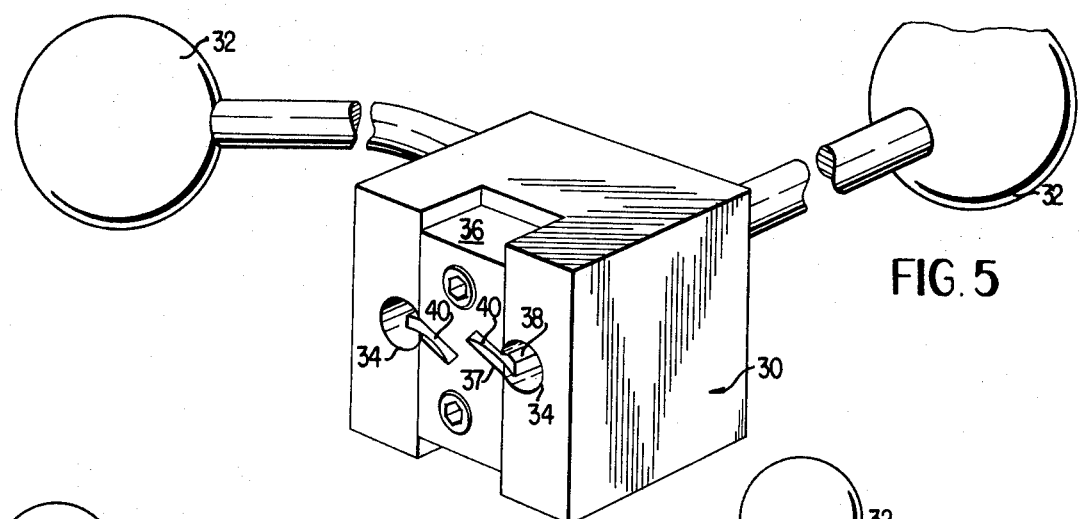
FIG. 5
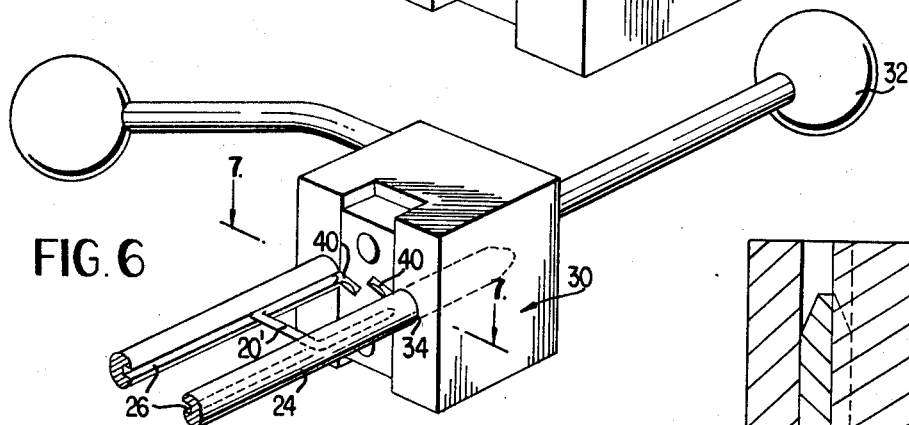
FIG. 6
FIG. 8
FIG. 7
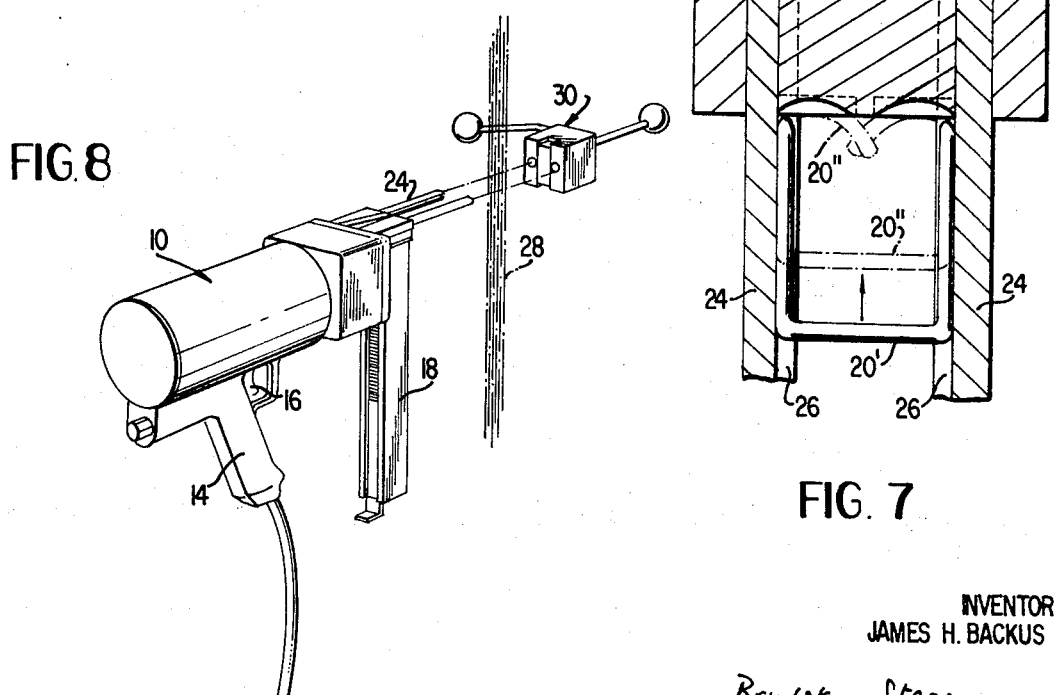
INVENTOR
JAMES H. BACKUS
BY Brufsky, Staas,
Breiner & Halsey
ATTORNEYS

FASTENING DEVICE

BACKGROUND OF THE INVENTION

The present invention relates to a device for fastening wires or other structural members together and is particularly designed for use in the construction of ferro-cement hulls wherein selected portions of a framework of wire mesh must be secured. As is well known, the hull of such ferro-cement vessels consists of a framework of wire mesh clamped together throughout. After the wire mesh framework is fabricated, the ferro-cement is applied thereto and hardens to form the finished hull. Although the process of securing the wire mesh can be done by hand, for example, by tying wires together, this method is obviously time consuming and not suitable for commercial production. Indeed, the commercial feasibility of manufacturing ferro-cement hulls depends upon the adaptation of modern fastening technique to this field of use.

Conventional stapling gun technique is not suitable for many reasons. It is apparent that to employ stapling technique in the fastening of wire mesh ferro-cement structure a system must be devised wherein the movement of the staple or other fastener is unobstructed by the wire mesh and the effective holding area of the staple is variable in accordance with the thickness of wires to be secured together.

SUMMARY OF THE INVENTION

In the present invention, conventional staple propelling technology is employed in conjunction with a novel guidance system comprising arms depending from the staple gun and provided with grooves permitting unobstructed movement of the staple therein. Furthermore, the invention includes an anvil assembly mounted for predetermined movement in relation to the arms so as to vary the position and effective holding area of the finished staple. While the stapling device disclosed in the present invention features an anvil structure separate from the guiding arms, the anvil may form an integral part of the arms depending from the gun. Thus, the present invention may be operated with either one or two persons, depending on whether the anvil is operated by the same person who operates the gun or whether the anvil is operated separately from the gun.

BRIEF DESCRIPTION OF THE DRAWINGS

FIG. 5 is a perspective view of one embodiment of the anvil illustrating in detail the curvilinear striking surfaces against which the staples are propelled;

FIG. 6 is a perspective view of the anvil slidably positioned on the arms of the stapling gun illustrating a staple just prior to contacting the curvilinear striking surfaces;

FIG. 7 is a cross-sectional view taken along line 7—7 of FIG. 6 illustrating in solid lines a staple just prior to contacting the anvil and in dotted lines the staple after contacting same wherein the ends thereof are turned partially into locking relation; and FIG. 8 is a perspective view illustrating positioning of the stapling gun and movable anvil on opposite sides of wire mesh to be stapled together.

DESCRIPTION OF THE PREFERRED EMBODIMENT

Figure 1:
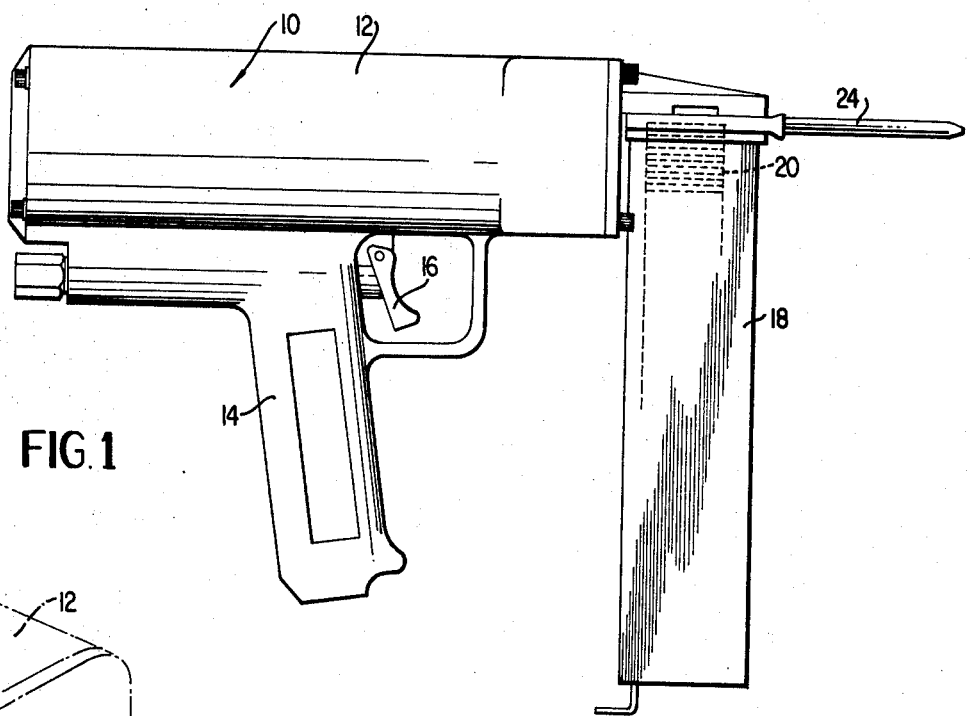
FIG. 1 is a side elevation illustrating the stapling gun and depending parallel arms, the staples within the magazine being illustrated in dotted lines for purposes of clarifying operation.

In FIG. 1 reference numeral 10 designates generally the stapling gun which employs conventional technique for driving industrial fasteners. Such fastener driving machines are well known in the art and are disclosed in U.S. Pat. Nos. 2,872,901 and 3,051,135, for example, incorporated by reference herein.

Figure 3:
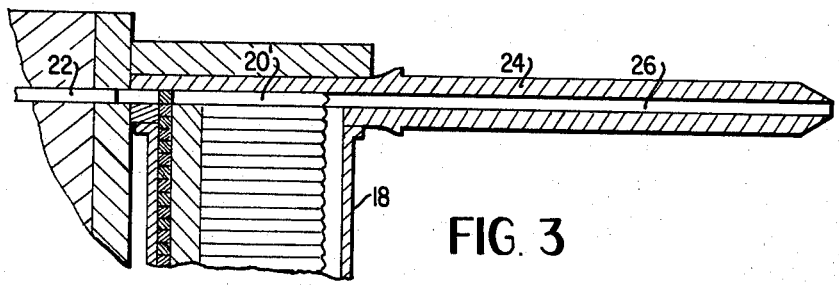
FIG. 3 is a side elevation in cross-section of the front of the fastening device illustrating the relationship of the staples and the longitudinal grooves within the depending arms.

In conventional manner, stapling gun 10 includes a driving head 12 below which is located a handle 14 provided with a trigger mechanism 16. A magazine 18 containing fasteners 20 is positioned forward of the driving head 10 in such manner that as the trigger mechanism 16 is activated appropriate force is generated, for example, by compressed air, to move the driving head 22 forward, as seen in FIG. 3, into contact with the uppermost fastener 20'.

Figure 2:
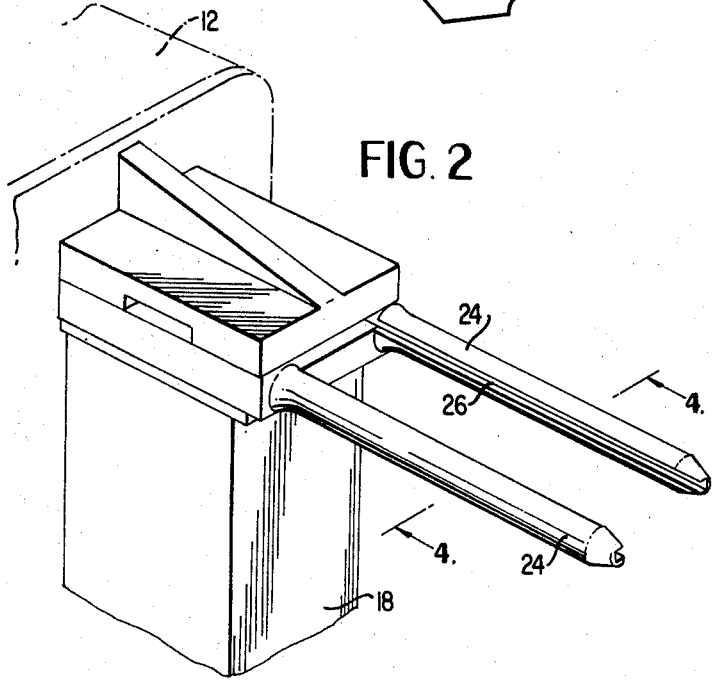
FIG. 2 is a perspective view of the front of the stapling device illustrating in detail the depending arms with longitudinal grooves therein along which the staples are propelled.
Figure 4:
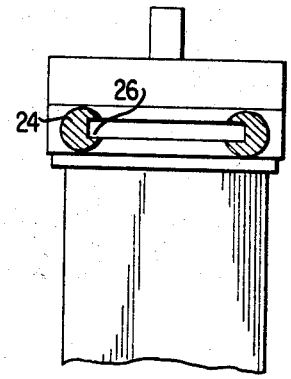
FIG. 4 is a cross-sectional view taken along line 4—4 of FIG. 2 illustrating the longitudinal grooves within the depending arms.

Formed as an integral part of the gun 10, as illustrated in FIG. 2, are parallel arms 24 within which are located longitudinal grooves 26. As illustrated in FIGS. 3 and 4, the uppermost staple 20' within the magazine 18 is positioned to move outwardly within grooves 26 when propelled. As will be apparent from FIG. 8, as the arms 24 are positioned over wire mesh 28, the staple being propelled from the gun 20 moves along grooves 26 in an unobstructed path until contact is made with the anvil 30, as will now be described.

The anvil 30, as illustrated in FIGS. 5 and 6, is provided with supports 32 permitting the user to hold the anvil 30 in a desired position. Within anvil 30 are located parallel passages 34 through which arms 24 slide, as will be explained hereinafter. An insert 36 is suitably positioned within the anvil 30 and is provided with opposed slots 37 within which are mounted mating blocks 38, each of which terminates in curvilinear striking surfaces 40. The anvil 30 is free to slide along arms 24 as blocks 38 fit within and slide along longitudinal grooves 26 of arms 24.

In use, the operator of the gun 10 positions the arms 24 around the wire mesh 28 to be stapled while the operator of the anvil 30 slides same along the arms 24 until the wire mesh 28 is confined. Then, the gun 10 is fired causing the staple 20', as illustrated in FIGS. 6 and 7, to move forward within grooves 26 until contact is made with the curvilinear striking surfaces 40, at which time the staple 20' continues its forward movement while the ends 20'' thereof are turned by the curvilinear striking surfaces 40 to tightly secure the wire mesh 28. In FIG. 7, the staple 20' shown in solid lines has just reached the point of contact with the curvilinear striking surfaces 40 while the staple shown in dotted lines is being turned by the striking surfaces 40. At the end of the stapling operation, the ends 20'' are bent beyond their position illustrated in FIG. 7 and tightly grip the wire mesh.

The anvil 30, as illustrated in FIGS. 5–8, is separate from the gun 10 thus requiring a first operator for the anvil 30 and a second operator for the gun 10. It is apparent, however, that the advantages achieved by the anvil embodiment disclosed in the present invention can also be accomplished where the anvil is formed as an integral part of the arms 24 depending from the gun 10. That is, each arm 24 may be provided with a pivoting anvil including the necessary curvilinear striking surface against which the staple is turned. In this type of construction, a telescoping or equivalent system is employed permitting the length of the arms to be varied since the anvil in such an embodiment is an integral part of the arms of the gun.

For this and other reasons, it is apparent that different arm and anvil arrangements may be contemplated without departing from the spirit and scope of the present invention as defined by the subjoined claims.

I claim:
1. In a device for propelling fasteners along a predetermined axis, the combination of:
   a pair of arms spaced apart from each other and secured to the device, said arms being provided with grooves corresponding to said axis along which said fasteners move; and
   anvil means mounted for predetermined movement in relation to said arms, including surfaces against which the fasteners strike causing the ends thereof to be bent into securing relation.

2. A device as in claim 1, said anvil means including passages through which said arms pass and blocks terminating in said surfaces against which the fasteners strike, portions of said blocks and said surfaces thereof extending within said passages of said anvil means and mounted to slide along said grooves of said arms.

3. A device as in claim 2, said passages being parallel to each other.

* * * * *